(12) United States Patent
Asano et al.

(10) Patent No.: US 8,358,334 B2
(45) Date of Patent: Jan. 22, 2013

(54) APPARATUS AND METHOD FOR PROCESSING IMAGE

(75) Inventors: Junta Asano, Osaka (JP); Masahiko Yoshiyama, Osaka (JP); Takashi Nakano, Osaka (JP); Yoshiaki Okuno, Osaka (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

(21) Appl. No.: 12/713,826

(22) Filed: Feb. 26, 2010

(65) Prior Publication Data

US 2010/0271464 A1    Oct. 28, 2010

(30) Foreign Application Priority Data

Apr. 22, 2009  (JP) .................................. 2009-103794
Oct. 15, 2009  (KR) ........................ 10-2009-0098410

(51) Int. Cl.
*H04N 13/04* (2006.01)

(52) U.S. Cl. .............. 348/51; 345/419; 348/42; 348/54; 348/614

(58) Field of Classification Search .................. None
See application file for complete search history.

(56) References Cited

U.S. PATENT DOCUMENTS

| | | | |
|---|---|---|---|
| 5,025,317 A * | 6/1991 | Koguchi et al. | 348/614 |
| 6,630,996 B2 * | 10/2003 | Rao et al. | 356/237.5 |
| 8,102,413 B2 * | 1/2012 | Mehrle | 348/42 |
| 2006/0268104 A1 * | 11/2006 | Cowan et al. | 348/42 |
| 2007/0120972 A1 * | 5/2007 | Kim et al. | 348/51 |
| 2007/0188602 A1 * | 8/2007 | Cowan et al. | 348/53 |
| 2010/0271464 A1 * | 10/2010 | Asano et al. | 348/51 |
| 2012/0050505 A1 * | 3/2012 | Yabui et al. | 348/54 |

* cited by examiner

*Primary Examiner* — Sath V Perungavoor
*Assistant Examiner* — Dakeshesh Parikh
(74) *Attorney, Agent, or Firm* — Sughrue Mion, PLLC

(57) ABSTRACT

Provided are an apparatus, a method, and a program for processing an image which reduces crosstalk and achieves high image quality. The method includes obtaining a differential signal by subtracting one input image signal of an object to be processed from another input image signal; applying a predetermined correction coefficient to the differential signal; determining, for each pixel, whether the differential signal is a negative value; selectively outputting, for each pixel, the differential signal, to which the predetermined correction coefficient is applied, as a correction signal based on a result of the determining; and correcting, for each pixel, the one input image signal based on the one input image signal and the correction signal that is selectively output if the differential signal is the negative value.

18 Claims, 3 Drawing Sheets

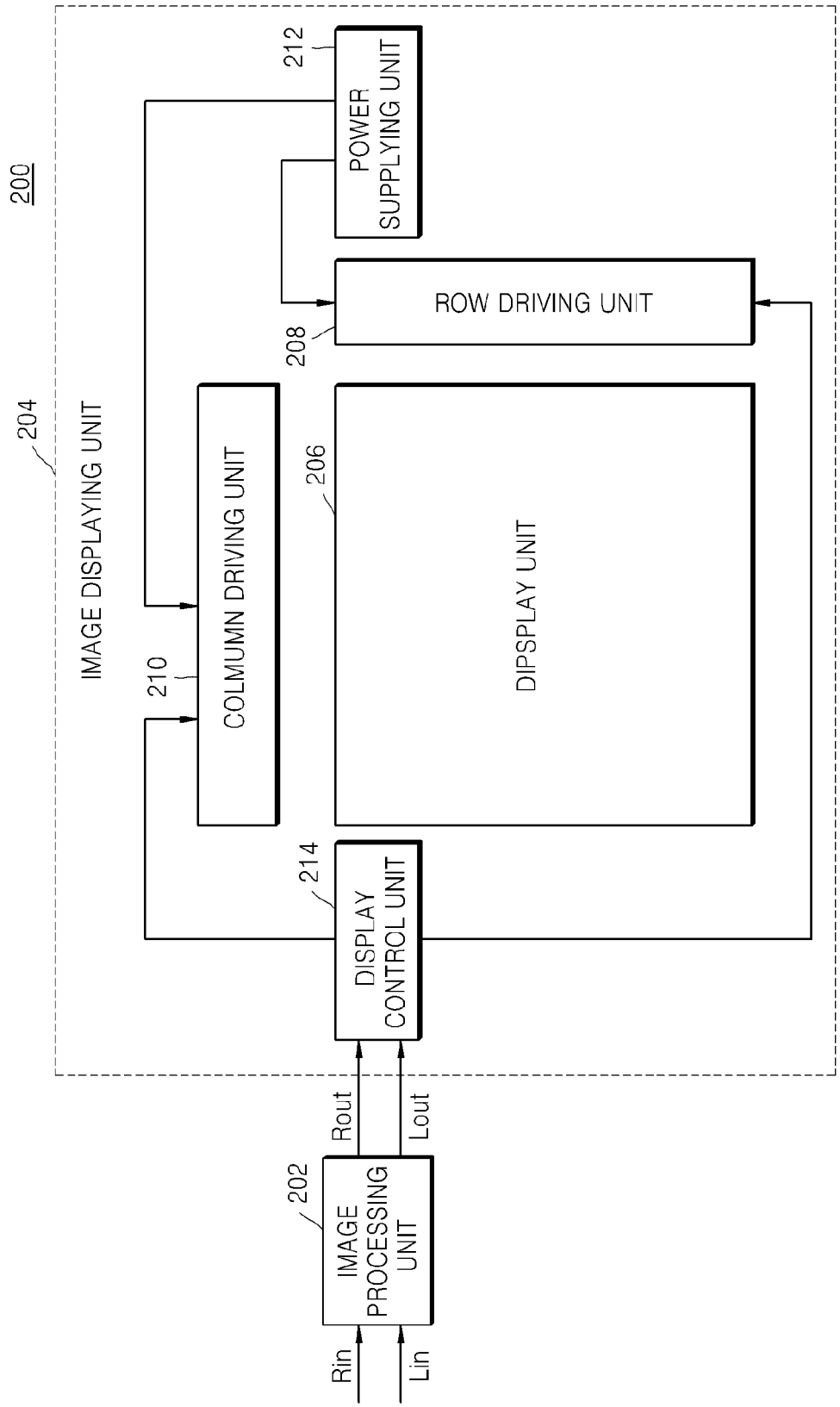

APPARATUS AND METHOD FOR PROCESSING IMAGE

CROSS-REFERENCE TO RELATED PATENT APPLICATION

This application claims priority from Japanese Patent Application No. 2009-103794, filed on Apr. 22, 2009 in the Japanese Patent Office, and Korean Patent Application No. 10-2009-0098410, filed on Oct. 15, 2009 in the Korean Intellectual Property Office, the disclosures of which are incorporated herein by reference in their entirety.

BACKGROUND

1. Field

Exemplary embodiments relate to an apparatus, a method, and a program for processing an image.

2. Description of the Related Art

When a stereoscopic image is displayed on a display screen based on a right eye image signal and a left eye image signal, crosstalk may occur. Crosstalk refers to a phenomenon by which an image defined by a right eye image signal leaks into an image defined by a left eye image signal or vise versa. Once crosstalk occurs, the leaked image becomes noise. Accordingly, it is important to prevent crosstalk in order to achieve high image quality.

Many attempts to reduce crosstalk have been made. In one case, crosstalk may be reduced by correcting image signals constituting a stereoscopic image.

For example, a method for reducing crosstalk in the related art corrects one image signal (e.g., a right eye image signal) and the other image signal (e.g., a left eye image signal), which constitute a stereoscopic image, using Equations 1 and 2. In Equations 1 and 2, the one image signal is denoted by "Rin", the one image signal after correction is denoted by "Rout", the other image signal is denoted by "Lin", and the other image signal after correction is denoted by "Lout". Also, in Equations 1 and 2, a correction coefficient for correcting crosstalk is denoted by "a".

$$R\text{out}=(R\text{in}-L\text{in}\times\alpha)/(1-\alpha)^2 \quad \text{[Equation 1]}$$

$$L\text{out}=(L\text{in}-R\text{in}\times\alpha)/(1-\alpha)^2 \quad \text{[Equation 2]}$$

The method of the related art corrects each of the image signals constituting the stereoscopic image by using the correction coefficient "α" for correcting crosstalk based on measurements such as a one eye optical measurement, one eye-based pattern evaluation, or two eyes-based pattern evaluation. Accordingly, an apparatus for processing an image using the method of the related art can reduce crosstalk to some degree by correcting the image signals using Equations 1 and 2.

However, the method of the related art considers only an image signal that is the remaining one when a signal is corrected, for example, the other image signal Lin when the one image signal Rin is corrected (Equation 1) or the one image signal Rin when the other image signal Lin is corrected (Equation 2). In detail, the method of the related art corrects an image signal by using "Lin×α" (Equation 1) or "Rin×α" (Equation 2) irrespective of which image is defined by the image signal. The method of the related art for processing an image performs the same correction even when image signals representing different stereoscopic images are input, for example, when an image signal representing a stereoscopic image displaying a bright full moon at night is input and an image signal representing a stereoscopic image displaying a bright full moon at day is input. Accordingly, crosstalk still occurs when the related art is used. Accordingly, there is a demand to improve the image quality of a displayed stereoscopic image.

SUMMARY

Exemplary embodiments provide an apparatus, a method, and a program for processing an image, which can reduce crosstalk and achieve high image quality.

According to an aspect of the exemplary embodiments, there is provided a method of processing an image, the method including: obtaining a differential signal by subtracting one input image signal of an object to be processed from another input image signal; applying a predetermined correction coefficient to the differential signal; determining, for each pixel, whether the differential signal is a negative value; selectively outputting, for each pixel, the differential signal, to which the predetermined correction coefficient is applied, as a correction signal based on a result of the determination; and correcting, for each pixel, the one input image signal based on the one input image signal and the correction signal that is selectively output.

Accordingly, crosstalk may be reduced and thus high image quality may be achieved.

According to another aspect of the exemplary embodiments, there is provided an apparatus for processing an image, the apparatus including: a first image processing unit which selectively corrects, for each pixel, a first input image signal based on the first input image signal and a second input image signal, which together constitute a stereoscopic image; and a second image processing unit which selectively corrects, for each pixel, the second input image signal based on the first input image signal and the second input image signal, wherein the first image processing unit includes: a first differential signal obtaining unit which obtains a first differential signal by subtracting the first input image signal from the second input image signal; a first determining unit which determines, for each pixel, whether the first differential signal is a negative value; a first weight setting unit which multiplies the first differential signal by a first correction coefficient; a first correcting signal outputting unit which selectively outputs, for each pixel, the first differential signal, which is multiplied by the first correction coefficient, as a first correction signal based on a result of the determination of the first determining unit; and a first signal correcting unit which corrects, for each pixel, the first input image signal based on the first input image signal and the first correction signal that is selectively output by the first correcting signal outputting unit, and the second image processing unit includes: a second differential signal obtaining unit which obtains a second differential signal by subtracting the second input image signal from the first input image signal; a second determining unit which determines, for each pixel, whether the second differential signal is a negative value; a second weight setting unit which multiplies the second differential signal by a second correction coefficient; a second correction signal outputting unit which selectively outputs, for each pixel, the second differential signal, which is multiplied by the second correction coefficient, as a second correction signal based on a result of the determination of the second determining unit; and a second signal correcting unit which corrects, for each pixel, the second input image signal based on the second input image signal and the second correction signal that is selectively output by the second correction signal outputting unit.

Accordingly, crosstalk may be reduced and thus high image quality may be achieved.

The first correction coefficient may be a predetermined first correction coefficient or a first correction coefficient associated with the first differential signal, and the second correction coefficient may be a predetermined second correction coefficient or a second correction coefficient associated with the second differential signal.

Accordingly, crosstalk may be reduced and thus high image quality may be achieved.

According to another aspect of the exemplary embodiments, there is provided a method of processing an image used by an apparatus which processes each of a first input image signal and a second input image signal, together constituting a stereoscopic image as an input image signal of an object to be processed, based on the first input image signal and the second input image signal, the method including: obtaining a differential signal by subtracting one of the first and second input image signals from the other first and second input image signal; multiplying the differential signal by a correction coefficient; determining, for each pixel, whether the differential signal is a negative value; selectively outputting, for each pixel, the differential signal, which is multiplied by the correction coefficient, as a correction signal; and correcting, for each pixel, the one of the first and second input image signals based on the one of the first and second input image signals and the correction signal that is selectively output.

Accordingly, crosstalk may be reduced and high image quality may be achieved.

According to another aspect of the exemplary embodiments, there is provided a computer readable medium having recorded thereon a program applicable to an apparatus for processing an image which processes each of a first input image signal and a second input image signal, which together constitute a stereoscopic image, as an input image signal of an object to be processed based on the first input image signal and the second input image signal, the program for causing a computer to execute a method of processing an image in the computer, wherein the method includes: obtaining a differential signal by subtracting one of the first and second input image signals of the object to be processed from the other first and second input image signal; multiplying the differential signal by a correction coefficient; determining, for each pixel, whether the differential signal is a negative value; selectively outputting, for each pixel, the differential signal, which is multiplied by the correction coefficient, as a correction signal based on a result of the determination; and correcting, for each pixel, the one of the first and second input image signals based on the one of the first and second input image signals and the correction signal that is selectively output.

Accordingly, crosstalk may be reduced and thus high image quality may be achieved.

BRIEF DESCRIPTION OF THE DRAWINGS

The above and other features and advantages of the exemplary embodiments will become more apparent by describing in detail the exemplary embodiments with reference to the attached drawings in which:

FIG. 3 is a block diagram of a display device according to an exemplary embodiment.

DETAILED DESCRIPTION

Figure 1:
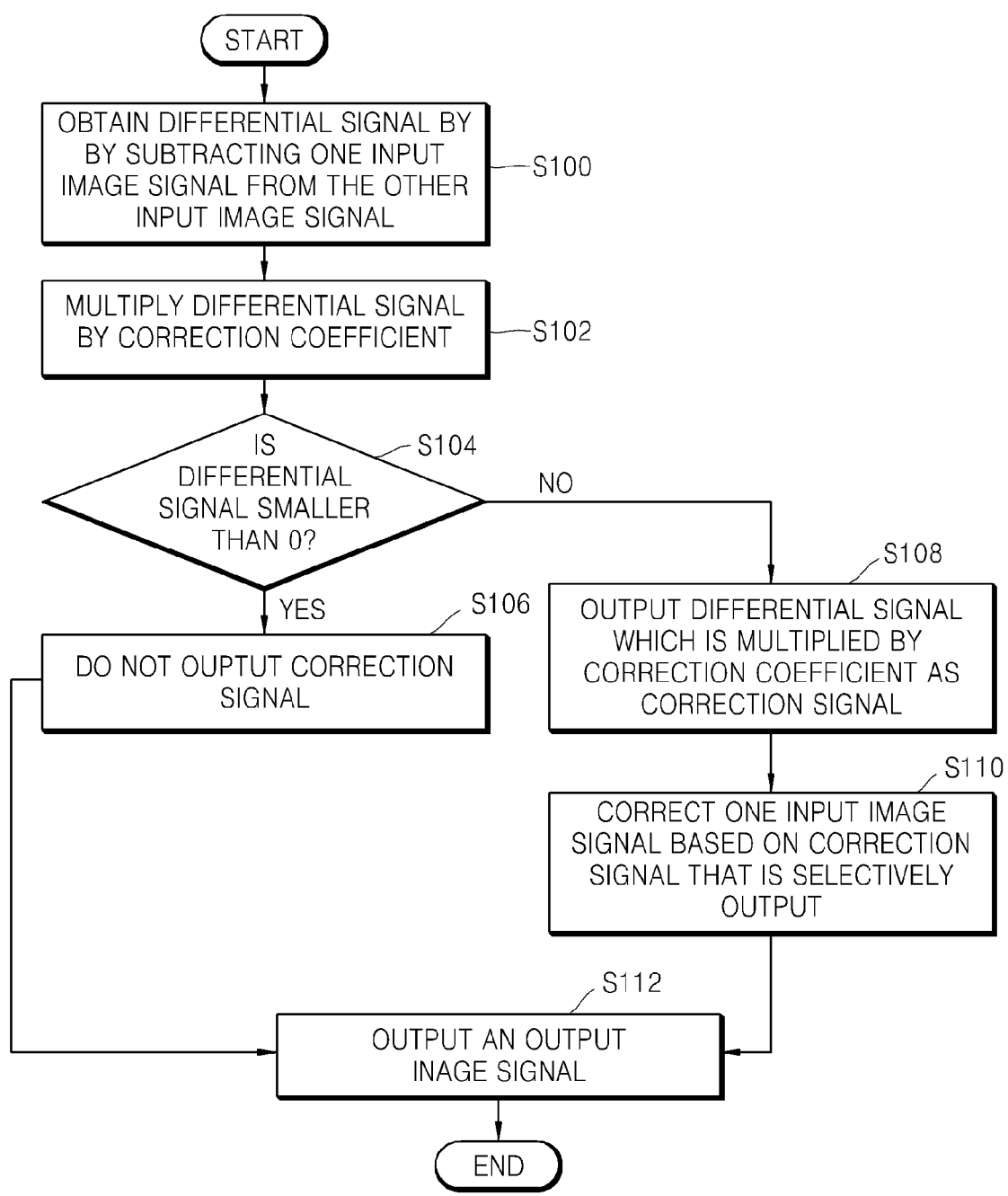
FIG. 1 is a flowchart illustrating a method of processing an image to reduce crosstalk according to an exemplary embodiment.

The exemplary embodiments will now be described more fully with reference to the accompanying drawings, in which the exemplary embodiments of the invention are shown. Like reference numerals in the drawings denote like elements, and repetitive descriptions will be avoided as necessary. Expressions such as "at least one of" when preceding a list of elements, modify the entire list of elements and do not modify the individual elements of the list. In addition, each "unit" described below comprises hardware.

An approach of the exemplary embodiments to prevent crosstalk will now be explained in view of the structure of an apparatus 100, shown in FIG. 2, for processing an image is explained.

It is assumed that a first input image signal and a second input image signal which together constitute a stereoscopic image are input to the apparatus 100, and the apparatus 100 processes the first input image signal and the second input image signal. The first input image signal may be a right eye image signal (or a left eye image signal) representing a right eye image (or a left eye image) of a user, and the second input image signal may be the left eye image signal (or the right eye image signal). Each of the first input image signal and the second input image signal constituting the stereoscopic image may be called an input image signal below.

The apparatus 100 selectively corrects, for each pixel, the first input image signal and the second input image signal using Equations 3 and 4 provided below based on the first input image signal and the second input image signal which together constitute the stereoscopic image. The first input image signal that is selectively corrected by the apparatus 100 is referred to as a first output image signal, and the second input image signal that is selectively corrected by the apparatus 100 is referred to as a second output image signal. Each of the first output image signal and the second output image signal may be called an output image signal below.

In Equations 3 and 4, the first input image signal is denoted by "Rin", the first output image signal is denoted by "Rout", the second input image signal is denoted by "Lin", and the second output image signal is denoted by "Lout". In Equation 3, a correction coefficient for correcting crosstalk is denoted by "α", and in Equation. 4, a correction coefficient for correcting crosstalk is denoted by "β". The correction coefficients α and β will be explained later.

$$\begin{cases} Rout = Rin - (Lin - Rin) \cdot \alpha & (Rin < Lin) \\ Rout = Rin & (Rin \geq Lin) \end{cases} \quad \text{[Equation 3]}$$

$$\begin{cases} Lout = Lin - (Rin - Lin) \cdot \beta & (Lin < Rin) \\ Lout = Lin & (Lin \geq Rin) \end{cases} \quad \text{[Equation 4]}$$

According to Equations 3 and 4, the apparatus 100 selectively corrects one input image signal of an object to be processed based on a brightness differential between one of the input image signals Rin or Lin and the other input image signal (e.g., based on Lin−Rin (Equation 3) or based on Rin−Lin (Equation 4)). That is, the apparatus 100 can selectively perform correction suitable for input image signals on the input image signals when input image signals representing different stereoscopic images are input, for example, when an input image signal representing a stereoscopic image displaying a bright full moon at night is input and an input image signal representing a stereoscopic image displaying a bright full moon at day is input.

Accordingly, the apparatus 100 can perform flexible correction, which is suitable for the first input image signal and the second input image signal, on the first input image signal and the second input image signal using Equations 3 and 4, respectively. Accordingly, the apparatus 100 can reduce crosstalk and thus achieve high image quality.

[Method of Processing Image to Reduce Crosstalk]

A method of processing an image to reduce crosstalk which is used by the apparatus 100 will now be explained below in detail.

FIG. 1 is a flowchart illustrating a method of processing an image to reduce crosstalk, which is used by the apparatus 100, according to an exemplary embodiment. In FIG. 1, one of a first input image signal and a second input image signal is an input image signal of an object to be processed, and the other input image signal is used to perform selective correction for each pixel. The apparatus 100 uses the method of FIG. 1 to process each of the first input image signal and the second input image signal as an input image signal of an object to be processed using Equation 3 or 4. The method of processing the image of FIG. 1 will now be explained assuming that an input image signal of an object to be processed is one input image signal and the remaining input image signal is the other input image signal.

In operation S100, the apparatus 100 subtracts the one input image signal of the object to be processed from the other input image signal to obtain a differential signal for each pixel. For example, if the first input image signal Rin is the one input image signal of the object to be processed, then apparatus 100 subtracts Rin from Lin (Lin−Rin). That is, the apparatus 100 obtains the differential signal in operation S100.

In operation S102, the apparatus 100 multiplies the differential signal by a correction coefficient. The correction coefficient may be a ratio of the other input image signal. The correction coefficient may be, for example, a predetermined value that is determined by the structure of the apparatus 100 and satisfies, but not limited to, 0<correction coefficient<1.0. For example, the apparatus 100 may use a value associated with the differential signal as the correction coefficient. That is, the apparatus 100 may output a value associated with the differential signal as the correction coefficient by using a lookup table containing a signal level of the differential signal and a corresponding correction coefficient, but the present exemplary embodiment is not limited thereto.

In operation S104, the apparatus 100 determines, for each pixel, whether the differential signal is a negative value (e.g., whether (Lin−Rin) is negative).

If it is determined in operation S104 that the differential signal is a negative value, the method proceeds to operation S106. In operation S106, the apparatus 100 does not output a correction signal corresponding to a pixel. Instead, the input image signal, which has not been corrected, is output.

Otherwise, if it is determined in operation S104 that the differential signal is not a negative value (i.e., the differential signal is equal to or greater than zero), the method proceeds to operation S108. In operation S108, the apparatus 100 outputs the differential signal, which is multiplied by the correction coefficient in operation S102 corresponding to a pixel, as a correction signal corresponding to the pixel.

The apparatus 100 performs selective correction for each pixel by performing operations S104 through S108.

Although operation S104 is performed after operation S102 in FIG. 1, the apparatus 100 may independently perform operation S102 and operation S104. Accordingly, the apparatus 100 may simultaneously perform operations S102 and S104, or may perform operation S102 after operation S104. Furthermore, although operation S104 makes a determination based on whether the differential signal is a negative value or not, the operation S104 is performed in another exemplary embodiment such that the determination is based on whether the differential signal is a positive value (i.e., greater than zero) or not. In this case, if the differential signal is greater than zero, the method proceeds to operation S108. If the differential signal is equal to or less than zero (i.e., not positive), then the method proceeds to operation S106.

In operation S110, the apparatus 100 corrects the one input image signal based on the correction signal that is selectively output through operations S104 through S108. The apparatus 100 may perform correction, for each selected pixel, by subtracting the correction signal (e.g., (Lin−Rin)·α), which is selectively output for each pixel, from the one input image signal. The input image signal corrected in operation S110 corresponds to an output image signal (a first output image signal or a second output image signal). Alternatively, when the input image signal is not corrected, according to operation S106, the one input image signal is output as the output image signal. Thus, in operation S112, an output image signal corresponding to each pixel is output, being either the original one input image signal from operation S106 or the corrected input image signal from operation S110.

For example, the apparatus 100 may perform correction according to Equation 3 (i.e., when the one input image signal is a first input image signal Rin) and according to Equation 4 (i.e., when the one input image signal is a second input image signal Lin) using the method of FIG. 1. Accordingly, the apparatus 100 can reduce crosstalk using the method of FIG. 1. Of course, the method of the present exemplary embodiment is not limited to the method of FIG. 1 used by the apparatus 100 to reduce crosstalk.

(Apparatus for Processing an Image)

The structure of the apparatus 100 which can reduce crosstalk will now be explained.

Figure 2:
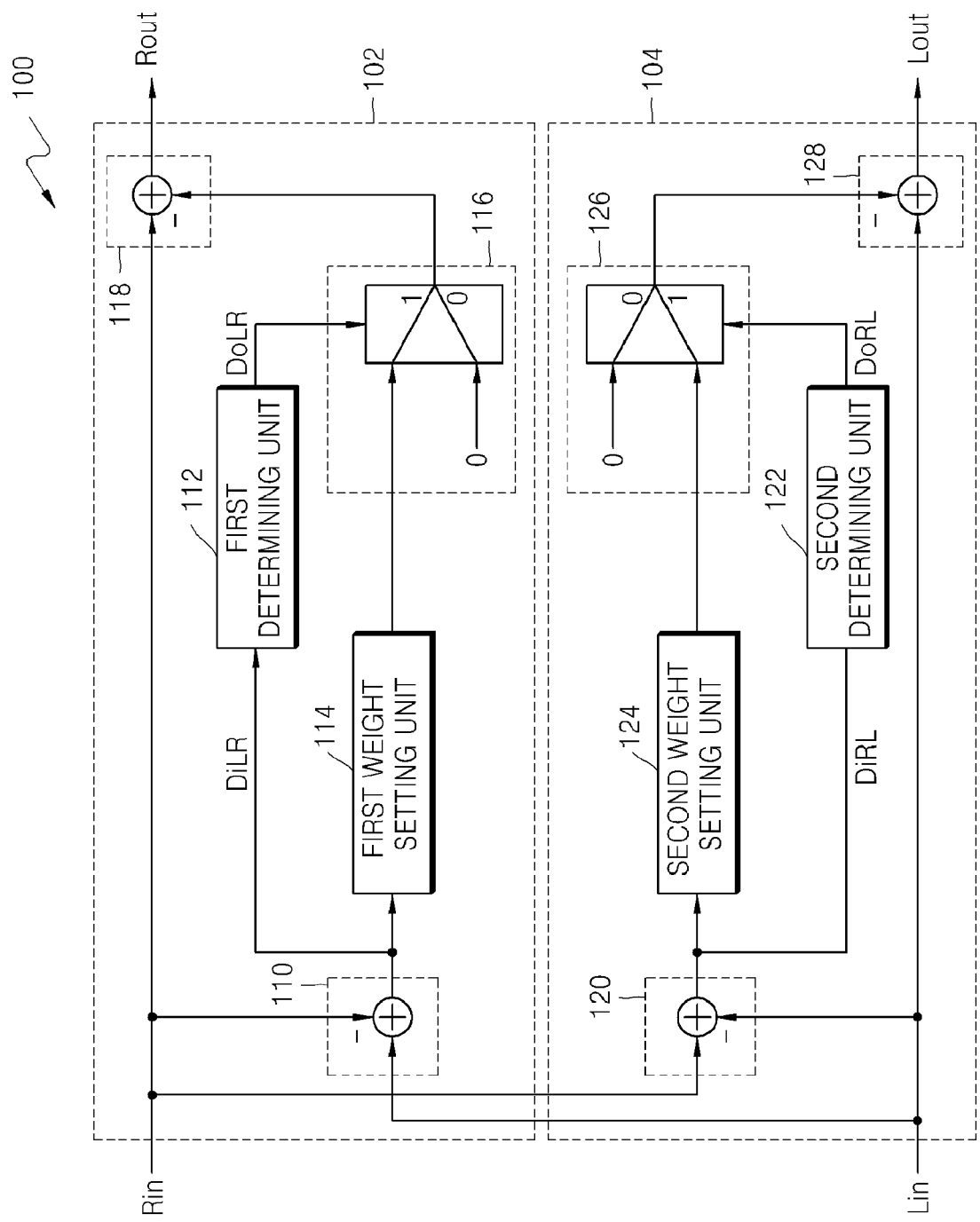
FIG. 2 is a block diagram of an apparatus for processing an image according to an exemplary embodiment.

FIG. 2 is a block diagram of the apparatus 100 according to an exemplary embodiment. In FIG. 2, the apparatus 100 respectively processes a first input image signal Rin and a second input image signal Lin which together constitute a stereoscopic image, and outputs a first output image signal Rout corresponding to the first input image signal Rin, and a second output image signal Lout corresponding to the second input image signal Lin. Of course, for example, the apparatus 100 may respectively process a first input image signal Lin and a second input image signal Rin, and output a first output image signal Lout corresponding to the first input image signal Lin and a second output image signal Rout corresponding to the second input image signal Rin.

An input image signal input to the apparatus 100 may be a digital signal used in digital broadcasting or the like, but the present exemplary embodiment is not limited thereto. For example, an input image signal input to the apparatus 100 may be an analog signal used in analog broadcasting. For example, if an input image signal is an analog signal, the apparatus 100 may be configured to process the analog input image signal, but the present exemplary embodiment is not limited thereto. For example, the apparatus 100 may further include an analog to digital (A/D) converter in the structure of FIG. 2 to convert an analog signal to a digital signal.

Although an input image signal input to the apparatus 100 may be transmitted from a broadcasting station or the like and received by the apparatus 100, the present exemplary embodiment is not limited thereto. For example, an input image signal input to the apparatus 100 may be transmitted from an external device through a network and received by the apparatus 100, or may be an image file stored in a memory unit (not shown) of the apparatus 100 and read out by the apparatus 100.

The network may be, but not limited to, a wired network, such as a local area network (LAN), a wireless network, such as a wireless wide area network (WWAN), or the Internet using a communication protocol, such as a transmission control protocol/Internet protocol (TCP/IP).

Referring to FIG. 2, the apparatus 100 includes a first image processing unit 102 selectively correcting, for each pixel, the first input image signal Rin, and a second image processing unit 104 selectively correcting, for each pixel, a second input image signal Lin. Signal processing of the first image processing unit 102 and the second image processing unit 104 may be realized by hardware, such as a signal processing circuit, or a combination of hardware and software, such as signal processing software.

The apparatus 100 may include, for example, a control unit (not shown) for controlling the apparatus 100, a read only memory (ROM) (not shown), a random access memory (RAM) (not shown), a receiving unit (not shown) for receiving an input image signal transmitted from a broadcasting station or the like, a memory unit (not shown) for storing an image file, an operating unit (not shown) operable by a user, and a communication unit (not shown) for communicating with an external device (not shown). The apparatus 100 may connect the above elements through a bus that is a data path.

The control unit may be a micro processing unit (MPU) or an integrated circuit in which a plurality of circuits for control are integrated. The control unit may serve as the first image processing unit 102 and/or the second image processing unit 104. The ROM stores data for control such as operational parameters or programs used by the control unit. The RAM first stores programs and the like executed by the control unit.

The memory unit may be, but not limited to, a magnetic recording medium, such as a hard disk, a non-volatile memory device, such as an electrically erasable and programmable read only memory (EEPROM), a flash memory, a magnetoresistive random access memory (MRAM), a ferroelectric random access memory (FeRAM), or a phase change random access memory (PRAM), or a magneto optical disk. The operating unit may be, but not limited to, an input device, such as a keyboard or a mouse, buttons, direction keys, or a combination thereof.

The apparatus 100 and the external device (not shown) may be connected to each other physically using, for example, a universal serial bus (USB) terminal or an IEEE 1394 terminal, or wirelessly using a wireless universal serial bus (WUSB) or IEEE 802.11. Alternatively, the apparatus 100 and the external device may be connected to each other, for example, through a network. Accordingly, the communication unit has an interface according to a connection type between the apparatus 100 and the external device.

[Structure of First Image Processing Unit]

The first image processing unit 102 selectively corrects, for each pixel, the first input image signal Rin based on the first input image signal Rin and the second input image signal Lin.

The first image processing unit 102 includes a first differential signal obtaining unit 110, a first determining unit 112, a first weight setting unit 114, a first correction signal outputting unit 116, and a first signal correcting unit 118.

The first differential signal obtaining unit 110 obtains a first differential signal DiLR by subtracting the first input image signal Rin from the second input image signal Lin. The first differential signal obtaining unit 110 may be, but not limited to, an adder or a subtractor.

The first determining unit 112 determines, for each pixel, whether the first differential signal DiLR is a negative value based on the first differential signal DiLR output from the first differential signal obtaining unit 110. The first determining unit 112 outputs a signal DoLR according to a result of the determination.

The first determining unit 112 may be, but not limited to, a comparator. The signal DoLR output from the first determining unit 112 may be a high level signal or a low level signal according to a result of the determination. For example, the first determining unit 112 outputs a low level signal when the first differential signal DiLR is a negative value, and outputs a high level signal when the differential signal DiLR is not a negative value, but the present exemplary embodiment is not limited thereto.

The first weight setting unit 114 applies a correction coefficient to a differential signal. In detail, the first weight setting unit 114 multiplies the first differential signal DiLR, which is output from the first differential signal obtaining unit 110, by a first correction coefficient $\alpha$. The first weight setting unit 114 may be, but not limited to, a multiplier.

The first correction coefficient $\alpha$ may be a predetermined value that is determined according to the structure of the apparatus 100 based on measurements, such as a one eye optical measurement, one eye-based pattern evaluation, or two eyes-based pattern evaluation. In this case, the first weight setting unit 114 appropriately reads out and processes correction coefficient information (data) stored in a memory unit (not shown) or a recording medium, such as a ROM, included in the first weight setting unit 114.

Although the first weight setting unit 114 uses the first correction coefficient $\alpha$ that is a predetermined value, the present exemplary embodiment is not limited thereto. For example, the first weight setting unit 114 may use a first correction coefficient $\alpha$ associated with the first differential signal DiLR based on the first differential signal DiLR and a lookup table containing a signal level of a differential signal DiLR and a corresponding correction coefficient $\alpha$. The lookup table may be, but not limited to, stored in the memory unit or the recording medium, such as a ROM, included in the first weight setting unit 114. Information recorded in the lookup table is determined based on, for example, a one eye optical measurement, one eye-based pattern evaluation, or two eyes-based pattern evaluation. For example, although information indicating that a correction coefficient increases as a differential signal increases is recorded in the lookup table, the present exemplary embodiment is not limited thereto.

The first correction signal outputting unit 116 selectively outputs, for each pixel, the first differential signal DiLR, which is multiplied by the first correction coefficient $\alpha$ in the first weight setting unit 114, as a first correction signal, based on the signal DoLR that is output from the first determining unit 112. The first correction signal outputting unit 116 may be, for example, a switching circuit based on a signal level of the signal DoLR, but the present exemplary embodiment is not limited thereto. For example, the first correction signal outputting unit 116 may employ an arbitrary element for selectively outputting the first differential signal DiLR, which is multiplied the correction coefficient $\alpha$, as a first correction signal, based on the signal DoLR.

The first signal correcting unit 118 corrects, for each pixel, the first input image signal Rin based on the first correction signal that is selectively output, for each pixel, from the first correction signal outputting unit 116. The first signal correcting unit 118 may correct the first input image signal Rin, for example, by subtracting, for each pixel, the first correction signal from the first input image signal Rin. The first signal correcting unit 118 may be an adder or a substractor, but the present exemplary embodiment is not limited thereto. However, if the signal DoLR indicates that the first differential signal DiLR is not a negative value, the first correction signal outputting unit 116 does not output the first correction signal.

As a result, for that particular pixel, the first signal correcting unit 118 does not perform any correction on the first input image signal Rin, and the first image input signal Rin is output as the first output image signal Rout.

Accordingly, the first signal correcting unit 118 outputs the first input image signal Rin, which is selectively corrected, as the first output image signal Rout.

The first image processing unit 102 constructed as described above may output, for example, the first output image signal Rout using Equation 3. Accordingly, the first image processing unit 102 constructed as described above can reduce crosstalk. Of course, the present exemplary embodiment is not limited to the structure of the first image processing unit 102 satisfying Equation 3 to reduce crosstalk.

[Structure of Second Image Processing Unit]

The second image processing unit 104 selectively corrects, for each pixel, the second input image signal Lin based on the first input image signal Rin and the second input image signal Lin.

The second image processing unit 104 includes a second differential signal obtaining unit 120, a second determining unit 122, a second weight setting unit 124, a second correction signal outputting unit 126, and a second signal correcting unit 128. The second image processing unit 104 may have the same structure as the first image processing unit 102, and each of the elements constituting the second image processing unit 104 may have the same function and structure as its counterpart of the first image processing unit 102.

In detail, the second differential signal obtaining unit 120 obtains a second differential signal DiRL by subtracting the second input image signal Lin from the first input image signal Rin.

The second determining unit 122 determines, for each pixel, whether the second differential signal DiRL is a negative value based on the second differential signal DiRL that is output from the second differential signal obtaining unit 120. The second determining unit 122 outputs a signal DoRL according to a result of the determination.

The second weight setting unit 124 multiplies the second differential signal DiRL, which is output from the second differential signal obtaining unit 120, by a second correction coefficient $\beta$.

The second correction coefficient $\beta$, like the first correction coefficient $\alpha$, may be, for example, a predetermined value that is determined by the structure of the apparatus 100 based on measurements. In this case, the second weight setting unit 124 may appropriately read out and process correction coefficient information (data) stored in a memory (not shown) or a recording medium, such as a ROM, included in the second weight setting unit 124.

The second weight setting unit 124, like the first weight setting unit 114, may use the second correction value $\beta$ that is a predetermined value, or a second correction coefficient $\beta$ that is associated with the second differential signal DiRL. The first correction coefficient $\alpha$ used by the first weight setting unit 114 and the second correction coefficient $\beta$ used by the second weight setting unit 124 may be the same value (when it is a predetermined value) or a value based on the same lookup table (when it is a value associated with the differential signal), but the present exemplary embodiment is not limited thereto.

The second correction signal outputting unit 126 selectively outputs, for each pixel, the second differential signal DiRL, which is multiplied by the second correction coefficient $\beta$ in the second weight setting unit 124, as a second correction signal based on the signal DoRL that is output from the second determining unit 122.

The second signal correcting unit 128 corrects, for each pixel, the second input image signal Lin based on the second input image signal Lin and the second correction signal that is selectively output, for each pixel, from the second correction signal outputting unit 126. The second signal correcting unit 128 may correct the second input image signal Lin, for example, by subtracting, for each pixel, the second correction signal from the second input image signal Lin. The second signal correcting unit 128 outputs the second input image signal Lin, which is selectively corrected by the second signal correcting unit 128, as the second output image signal Lout.

The second image processing unit 104 constructed as described above may output, for example, the second output image signal Lout using Equation 4. Accordingly, the second image processing unit 104 constructed as described above can reduce crosstalk. Of course, the present exemplary embodiment is not limited to the structure of the second image processing unit 104 of FIG. 2 satisfying Equation 4 to reduce crosstalk.

The apparatus 100 constructed as described above may output, for example, the first output image signal Rout corresponding to Equation 3 and the second output image signal Lout corresponding to Equation 4 based on the first input image signal Rin and the second input image signal Lin which together constitute the stereoscopic image. Accordingly, the apparatus 100 can reduce crosstalk and thus achieve high image quality.

As described above, the apparatus 100 includes the first image processing unit 102 for performing correction using Equation 3 and the second image processing unit 104 for performing correction using Equation 4. The apparatus 100 selectively corrects one input image signal of an object to be processed based on a differential between the one input image signal (e.g., the first input image signal Rin or the second input image signal Lin) and the other input image signal (e.g., the second input image signal Lin or the first input image signal Rin). Accordingly, the apparatus 100 can perform flexible correction, which is suitable for the first input image signal Rin and the second input image signal Lin, on the first input image signal Rin and the second input image signal Lin using Equation 3 and Equation 4, respectively. Since the apparatus 100 corrects an input image signal based on a brightness differential between the first input image signal Rin and the second input image signal Lin, which are almost the same, by considering an image (moving image/still image) that is actually observed by a user, the apparatus 100 can reduce crosstalk more than an apparatus for processing an image of the related art which corrects an input image signal based on a brightness differential between image signals having full brightness and zero brightness. Accordingly, the apparatus 100 can reduce crosstalk and thus achieve high image quality.

Although the apparatus 100 has been exemplarily explained, the present exemplary embodiment is not limited thereto. For example, a display device, such as an organic electroluminescent (EL) display device, a liquid crystal display (LCD) device, or a plasma display panel (PDP), a computer, such as a personal computer (PC) or a server, or a mobile communication device, such as a mobile phone or a personal handphone system (PHS) may be used. The apparatus 100 may be an integrated circuit (IC) chip in which the elements of FIG. 2 are integrated. The application of the apparatus 100 to a display device will be explained later.

[Program of Apparatus for Processing Image]

Crosstalk may be reduced and high image quality may be achieved by using a program recording on a computer readable recording medium that enables a computer to function as an apparatus for processing an image according to an exemplary embodiment.

[Display Device According to an Exemplary Embodiment]

A display device 200 to which an apparatus for processing an image is applied according to an exemplary embodiment will now be explained.

FIG. 3 is a block diagram of the display device 200 according to an exemplary embodiment. Although the display device 200 is illustrated in FIG. 3, the present exemplary embodiment is not limited to the structure of the display device 200.

Referring to FIG. 3, the display device 200 includes an image processing unit 202 and an image displaying unit 204.

The display device 200 may include, for example, a display device control unit (not shown) for controlling the display device 200, a ROM (not shown), a RAM (not shown), a display device memory unit (not shown), a display device operating unit (not shown) operable by a user, a receiving unit (not shown) for receiving an input image signal transmitted from a broadcasting station or the like, and a communication unit (not shown) for communicating with an external device (not shown). The display device 200 may connect the above elements through a bus that is a data path.

The display device control unit may be a microprocessor unit (MPU) or an integrated circuit in which a plurality of circuits for control are integrated. The display device control unit may serve as the image processing unit 202. The ROM stores data for control such as operational parameters or programs used by the display device control unit. The RAM first stores programs and the like executed by the display device control unit.

The display device memory unit may store, for example, various data or applications for correcting each of the input image signals constituting a stereoscopic image, such as information about the correction coefficient or the lookup table. The display device memory unit may be, but not limited to, a magnetic recording medium, such as a hard disk, or a non-volatile memory, such as a flash memory. The display device operating unit may be, but not limited to, an input device, such as a keyboard or a mouse, buttons, direction keys, or a combination thereof.

The display device 200 and the external device may be connected to each other physically using, for example, a USB terminal, or wirelessly using a WUSB, or the like. Alternatively, the display device 200 and the external device may be connected to each other, for example, through a network. Accordingly, the communication unit included in the display device 200 has an interface according to a connection type between the display device 200 and the external device.

The image processing unit 202 may have the same structure as the apparatus 100 of FIG. 2. Accordingly, the image processing unit 202 may selectively correct, for each pixel, a first input image signal Rin and a second input image signal Lin based on the first input image signal Rin and the second input image signal Lin which together constitute a stereoscopic image.

The image displaying unit 204 displays on a display screen an image defined by a first output image signal Rout and an image defined by a second output image signal Lout based on the first output image signal Rout and the second output image signal Lout which are output from the image processing unit 202.

[Structure of Image Displaying Unit]

The image displaying unit 204 includes a display unit 206, a row driving unit 208, a column driving unit 210, a power supplying unit 212, and a display control unit 214.

The display unit 206 includes a plurality of pixels arranged in a matrix. For example, the display unit 206 displaying a standard definition (SD) image has at least 640×480=307,200 (i.e., the number of data lines x the number of scan lines) pixels. If the pixels include red, green, and blue sub pixels for color display, the display unit 206 includes 640×480×3=921,600 (i.e., the number of data lines x the number of scan lines x the number of subpixel colors) sub pixels. Likewise, the display unit 206 displaying a high definition (HD) image has 1920×1080 pixels and includes 1920×1080×3 sub pixels for color display.

The display unit 206 may include a pixel circuit (not shown) for controlling the amount of voltage and the amount of current applied to each pixel. The pixel circuit may include a switch device and a drive device for controlling the amount of current using a scan signal and a voltage signal, and a capacitor for maintaining the voltage signal. Each of the switch device and the drive device may be, for example, a thin film transistor.

The row driving unit 208 and the column driving unit 210 scan each of the plurality of pixels included in the display unit 206 by applying a voltage signal to the pixels. One of the row driving unit 208 and the column driving unit 210 may apply a voltage signal, which determines whether to turn on or off a pixel, and the other may apply a voltage signal (image signal) according to an image to be displayed.

The row driving unit 208 and the column driving unit 210 may use a dot sequential scanning method scanning the pixels arranged in the matrix pixel by pixel, or a line sequential scanning method scanning the pixels arranged in the matrix line by line. Although the display device 200 includes the image displaying unit 204 including the two driving units, that is, the row driving unit 208 and the column driving unit 210 in FIG. 3, the present exemplary embodiment is not limited thereto. For example, the image displaying unit 204 of the displaying device 200 may include only one driving unit.

The power supplying unit 212 supplies power to the row driving unit 208 and the column driving unit 210, and applies a voltage to the row driving unit 208 and the column driving unit 210. The magnitude of the voltage applied to the row driving unit 208 and the column driving unit 210 by the power supplying unit 212 varies, for example, according to the first output image signal Rout and the second output image signal Lout output from the image processing unit 202.

The display control unit 214 may include an MPU, and inputs a control signal for applying a voltage which determines whether to turn on or off a pixel to one of the row driving unit 208 and the column driving unit 210, and inputs a first output image signal Rout and a second output image signal Lout to the other driving unit based on the first output image signal Rout and the second output image signal Lout which are output from the image processing unit 202. The display control unit 214 may control the power supplying unit 212 to supply power to the row driving unit 208 and the column driving unit 210 according to the first output image signal Rout and the second output image signal Lout which are output from the image processing unit 202.

The image displaying unit 204 constructed as described above may display on a display screen an image according to the first output image signal Rout and an image according to the second output image signal Lout based on the first output image signal Rout and the second output image signal Lout which are output from the image processing unit 202.

The display device 200 constructed as described above may selectively correct, for each pixel, a first input image signal Rin and a second input image signal Lin which together constitute the stereoscopic image, and may display an image according to the corrected first input image signal Rin and the corrected second input mage signal Lin. The image processing unit 202 included in the display device 200 has the same structure as the apparatus 100 of FIG. 2. Accordingly, the display device 200 including the image processing unit 202 can display an image with reduced crosstalk on a screen.

Although the display device 200 of FIG. 3 has been exemplarily explained, the present exemplary embodiment is not limited thereto. For example, unless the display device 200 displays a stereoscopic image to a user wearing an external device, such as polarization glasses or liquid crystal shutter glasses, the display device 200 may further include a mechanism for parallax barrier in the image displaying unit 204.

As described above, the display device 200 includes the image processing unit 202 that has the same function and structure as the apparatus 100 and performs the same method as described in conjunction with FIG. 1. Accordingly, the display device 200 can perform flexible correction, which is suitable for a first input image signal Rin and a second input image signal Lin constituting a stereoscopic image, on the first input image signal Rin and the second input image signal Lin using Equation 3 and Equation 4, respectively. Since the display device 200, like the apparatus 100, corrects an input image signal based on a brightness differential between the first input image signal Rin and the second input image signal Lin, which are almost the same, by considering an image (moving image/still image) that is actually observed by a user, the display device 200 can achieve reduce crosstalk more than an apparatus of the related art for processing an image. Also, the display device 200 displays on a display screen an image according to the corrected first input image signal Rin and an image according to the corrected second input image signal Lin. Accordingly, since the display device 200 can display an image with reduced crosstalk on the display screen, higher image quality can be achieved.

Although the display device 200 has been exemplarily explained, the present exemplary embodiment is not limited thereto. For example, the present exemplary embodiment may be applied to various display devices, such as an organic EL display device, an LCD device, or a PDP, or to various appliances, such as a television set for receiving digital broadcasts/analog broadcasts.

While the exemplary embodiments have been particularly shown and described, it will be understood by one of ordinary skill in the art that various changes in form and details may be made therein without departing from the spirit and scope of the present invention as defined by the following claims.

What is claimed is:

1. A method of processing an image, the method comprising:
    obtaining a differential signal by subtracting one input image signal of an object to be processed from another input image signal;
    applying a predetermined correction coefficient to the differential signal;
    determining, for each pixel, whether the differential signal is a negative value;
    selectively outputting, for each pixel, the differential signal, to which the predetermined correction coefficient is applied, as a correction signal based on a result of the determining; and
    correcting, for each pixel, the one input image signal based on the one input image signal and the correction signal that is selectively output if the differential signal is the negative value.

2. The method of claim 1, wherein the applying of the predetermined correction coefficient to the differential signal comprises multiplying the differential signal by a predetermined value.

3. The method of claim 1, wherein the applying of the predetermined correction coefficient to the differential signal comprises multiplying the differential signal by a predetermined correction coefficient or a correction coefficient associated with the differential signal.

4. The method of claim 1, wherein the selectively outputting of the differential signal as the correction signal comprises:
    if it is determined that the differential signal is the negative value, not outputting a correction signal corresponding to a pixel, and
    if it is determined that the differential signal is not the negative value, outputting the differential signal, which is multiplied by the predetermined correction coefficient, as the correction signal corresponding to the pixel.

5. The method of claim 1, wherein the one input image signal is one of a right eye image signal and a left eye image signal and the other input image signal is another of the right eye image signal and the left eye image signal which together constitute a stereoscopic image.

6. A method of processing an image used by an apparatus which processes each of a first input image signal and a second input image signal, together constituting a stereoscopic image as an input image signal of an object to be processed, based on the first input image signal and the second input image signal, the method comprising:
    obtaining a differential signal by subtracting one of the first and the second input image signals from another of the first and the second input image signals;
    multiplying the differential signal by a correction coefficient;
    determining, for each pixel, whether the differential signal is a negative value;
    selectively outputting, for each pixel, the differential signal, which is multiplied by the correction coefficient, as a correction signal; and
    correcting, for each pixel, the one of the first and the second input image signals based on the one of the first and second input image signals and the correction signal that is selectively output if the differential signal is the negative value.

7. An apparatus for processing an image, the apparatus comprising:
    a differential signal obtaining unit which obtains a differential signal by subtracting one input image signal of an object to be processed from another input image signal;
    a weight setting unit which multiplies the differential signal, which is obtained by the differential signal obtaining unit, by a predetermined correction coefficient;
    a determining unit which determines, for each pixel, whether the differential signal is a negative value;
    a correction signal outputting unit which selectively outputs, for each pixel, the differential signal, which is multiplied by the predetermined correction coefficient by the weight setting unit, as a correction signal based on a result of a determination of the determining unit; and
    a signal correcting unit which corrects, for each pixel, the one input image signal based on the one input image signal and the correction signal that is selectively output by the correction signal outputting unit if the differential signal is the negative value.

8. The apparatus of claim 7, wherein the weight setting unit multiplies the differential signal by a predetermined correction coefficient or a correction coefficient associated with the differential signal.

9. The apparatus of claim 7, wherein, if the determining unit determines that the differential signal is the negative value, the correction signal outputting unit does not output a correction signal corresponding to the pixel, and if the determining unit determines that the differential signal is not the negative value, the correction signal outputting unit outputs the differential signal, which is multiplied by the predetermined correction coefficient, as the correction signal corresponding to the pixel.

10. The apparatus of claim 7, wherein the one input image signal is one of a right eye image signal and a left eye image signal and the other input image signal is another of the right eye image signal and the left eye image signal which together constitute a stereoscopic image.

11. An apparatus for processing an image, the apparatus comprising:

a first image processing unit which selectively corrects, for each pixel, a first input image signal based on the first input image signal and a second input image signal which together constitute a stereoscopic image; and a second image processing unit which selectively corrects, for each pixel, the second input image signal based on the first input image signal and the second input image signal;

wherein the first image processing unit comprises:

a first differential signal obtaining unit which obtains a first differential signal by subtracting the first input image signal from the second input image signal;

a first determining unit which determines, for each pixel, whether the first differential signal is a negative value;

a first weight setting unit which multiplies the first differential signal by a first correction coefficient;

a first correcting signal outputting unit which selectively outputs, for each pixel, the first differential signal, which is multiplied by the first correction coefficient, as a first correction signal based on a result of a determination of the first determining unit; and a first signal correcting unit which corrects, for each pixel, the first input image signal based on the first input image signal and the first correction signal that is selectively output by the first correcting signal outputting unit if the first differential signal is the negative value, and the second image processing unit comprises:

a second differential signal obtaining unit which obtains a second differential signal by subtracting the second input image signal from the first input image signal;

a second determining unit which determines, for each pixel, whether the second differential signal is a negative value;

a second weight setting unit which multiplies the second differential signal by a second correction coefficient;

a second correction signal outputting unit which selectively outputs, for each pixel, the second differential signal, which is multiplied by the second correction coefficient, as a second correction signal based on a result of a determination of the second determining unit; and a second signal correcting unit which corrects, for each pixel, the second input image signal based on the second input image signal and the second correction signal that is selectively output by the second correction signal outputting unit if the second differential signal is the negative value.

12. The apparatus of claim 11, wherein the first weight setting unit multiples the first differential signal by a predetermined first correction coefficient or a first correction coefficient associated with the first differential signal, and the second weight setting unit multiples the second differential signal by a predetermined second correction coefficient or a second correction coefficient associated with the second differential signal.

13. A non-transitory computer readable recording medium having encoded thereon a program applicable to an apparatus which processes each of a first input image signal and a second input image signal, which together constitute a stereoscopic image, as an input image signal of an object to be processed based on the first input image signal and the second input image signal, the program for causing a computer to execute a method of processing an image in the computer, wherein the method comprises:

obtaining a differential signal by subtracting one of the first and the second input image signals of the object to be processed from another of the first and the second input image signal;

multiplying the differential signal by a correction coefficient;

determining, for each pixel, whether the differential signal is a negative value;

selectively outputting, for each pixel, the differential signal, which is multiplied by the correction coefficient, as a correction signal based on a result of the determining; and correcting, for each pixel, the one input image signal based on the one input image signal and the correction signal that is selectively output if the differential signal is the negative value.

14. The apparatus of claim 7, wherein signal correcting unit corrects the one input image signal by subtracting the correction signal from the one input image signal.

15. The apparatus of claim 11, wherein the first input image signal is a right eye image signal and the second input image signal is a left eye image signal, which together constitute a stereoscopic image.

16. An apparatus for processing an object of a stereoscopic image signal comprising a right eye image signal and a left eye image signal, the apparatus comprising:

a differential signal obtaining unit which obtains a differential signal for a pixel by subtracting a first input image signal from a second input image signal, wherein the first input image signal is one of the right eye image signal and the left eye image signal, and the second input image signal is the other of the right eye image signal and the left eye image signal;

a weight setting unit which multiplies the differential signal by a predetermined correction coefficient to output a correction signal;

a determining unit which determines for the pixel whether the differential signal is a negative value;

a correction signal outputting unit which is operable to output for the pixel the correction signal based on a result of a determination of the determining unit; and a signal correcting unit which is operable to correct the first input image signal by subtracting the correction signal from the first input image signal.

17. The apparatus of claim 16, wherein, if the determining unit determines that the differential signal is the negative value, the correction signal outputting unit does not output the correction signal, and the signal correcting unit outputs the first input image signal as a first output image signal, and if the determining unit determines that the differential signal is not the negative value, the correction signal outputting unit outputs the correction signal to the signal correcting unit, and the signal correcting unit corrects the first input image signal and outputs the corrected first input image signal as the first output image signal.

18. The apparatus of claim 17, wherein the pixel is of a plurality of pixels, the differential signal obtaining unit obtains the differential signal for each of the plurality of pixels on a pixel by pixel basis, and the determining unit determines for each of the plurality of pixels whether the differential signal is the negative value on the pixel by pixel basis.

* * * * *